United States Patent
Hauer et al.

(10) Patent No.: US 8,650,954 B2
(45) Date of Patent: Feb. 18, 2014

(54) QUADRATURE COMPENSATION FOR A ROTATION-RATE SENSOR

(75) Inventors: Joerg Hauer, Reutlingen (DE); Christoph Gauger, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 646 days.

(21) Appl. No.: 12/623,621

(22) Filed: Nov. 23, 2009

(65) Prior Publication Data

US 2010/0132461 A1 Jun. 3, 2010

(30) Foreign Application Priority Data

Nov. 25, 2008 (DE) .......................... 10 2008 044 053

(51) Int. Cl.
*G01C 19/56* (2012.01)
(52) U.S. Cl.
USPC ...................................................... 73/504.12
(58) Field of Classification Search
USPC .............................. 73/504.12, 504.14, 504.16
See application file for complete search history.

(56) References Cited

U.S. PATENT DOCUMENTS

| 6,257,059 B1* | 7/2001 | Weinberg et al. ........... 73/504.16 |
| 6,619,121 B1* | 9/2003 | Stewart et al. ............. 73/504.02 |
| 7,213,458 B2* | 5/2007 | Weber et al. ............... 73/504.12 |

FOREIGN PATENT DOCUMENTS

| DE | 10 2006 058 746 | 6/2008 |
| WO | WO 2008/071480 | 6/2008 |

* cited by examiner

*Primary Examiner* — John Chapman, Jr.
(74) *Attorney, Agent, or Firm* — Kenyon & Kenyon LLP

(57) ABSTRACT

A rotation-rate sensor includes a substrate having a surface, a movable element situated above the surface, which is deflectable based on a Coriolis force along a first axis that runs perpendicular to the surface, a driving device which is prepared to activate the movable element along a second axis that runs parallel to the surface, a compensation device, in order to generate an electrostatic force along the first axis, including electrodes corresponding to one another, developed on the substrate and on the movable element; a relative degree of covering of the electrodes in the direction of the first axis being a function of the deflection of the movable element along the second axis; and the electrode developed on the movable element runs around an insulating region of the movable element.

9 Claims, 3 Drawing Sheets

QUADRATURE COMPENSATION FOR A ROTATION-RATE SENSOR

FIELD OF THE INVENTION

The present invention relates to a rotation-rate sensor, especially for use in motor vehicles.

BACKGROUND INFORMATION

A rotation-rate sensor described in German Patent No. DE 10 2006 058 746 A1 has a movable element that is situated above the surface of a substrate and is able to be driven to vibrations by a driving device along a first axis running along the surface, and which is deflectable along a second axis that runs perpendicular to the surface of the substrate (out of plane) by the action of a Coriolis force, and has a compensation device that is equipped to compensate for undesired vibrations of the movable element along the second axis, which are caused by the driving device.

The undesired vibrations along the second axis are recorded as so-called quadrature signals, and they falsify the measurement results. The cause of the quadrature signals, in this instance, typically is asymmetries in the sensor structure, which are given rise to by production tolerances. The undesired vibrations along the second axis have the same frequency as the vibrations along the first axis. Their direction is determined by the type/shape of the asymmetry.

The present invention is based on the object of creating an improved compensation device for quadrature signals in a rotation-rate sensor that is equipped to record a Coriolis force directed perpendicular to the substrate.

SUMMARY OF THE INVENTION

The object of the present invention is attained by a rotation-rate sensor according to the present invention.

The compensation device described may advantageously be implemented in a particularly simple manner, and is reliable and cost-effective. Furthermore, a detection mass element is given which is compact and has only few fissures on its outer edges, whereby there is an increase in the robustness of the sensor to a fracture of a spring that is fastened to the detection mass element. The structures of the proposed compensation device are advantageously smaller than those known up to now, and therefore have an increased natural frequency, whereby the inclination of an undesired interaction with the measuring process is decreased.

DETAILED DESCRIPTION

Figure 1:
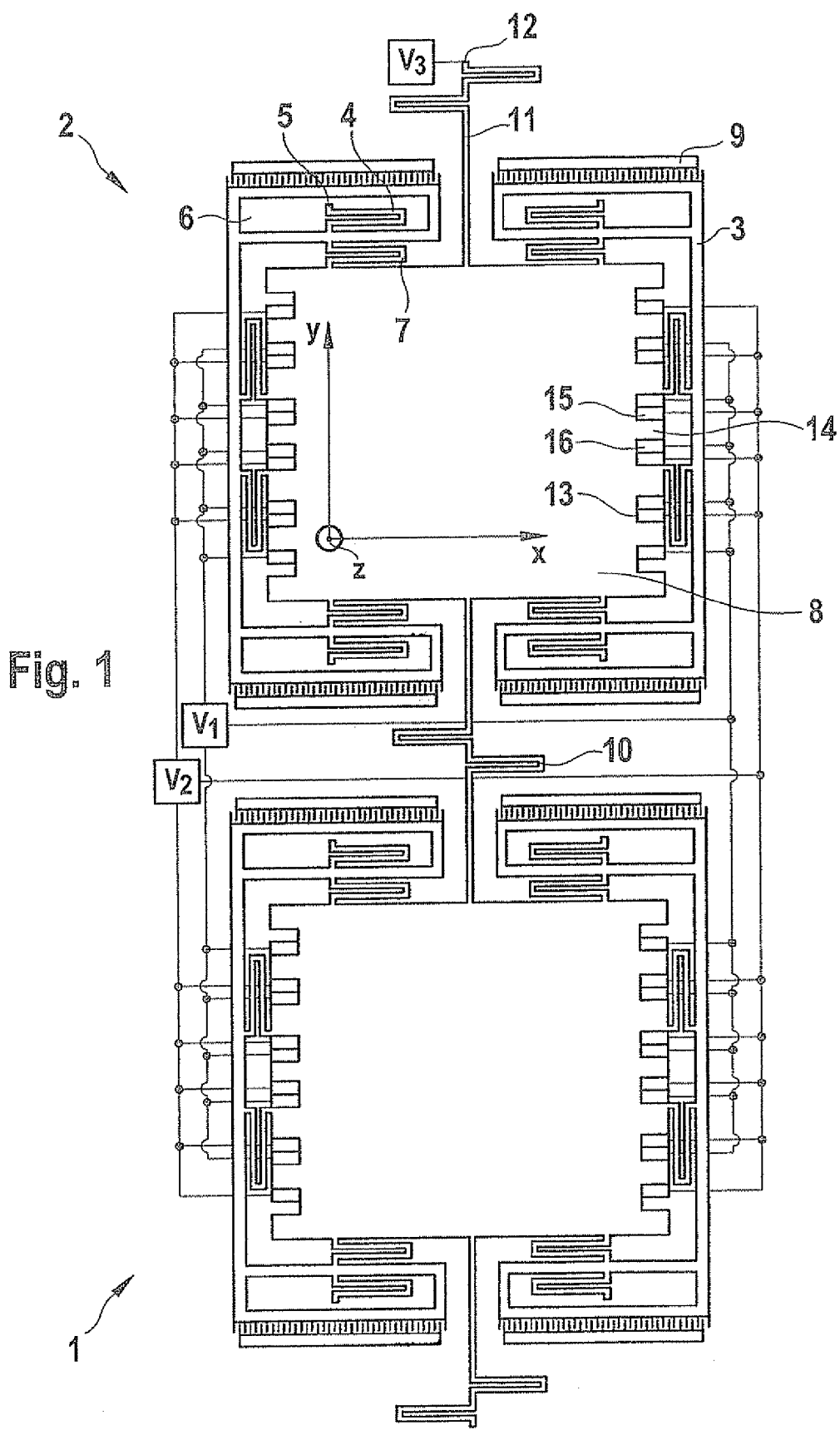
FIG. 1 shows a view of a rotation-rate sensor having a compensation device.

FIG. 1 shows a view of a rotation-rate sensor. The rotation-rate sensor includes two identical structures 1, 2 having a constant thickness which are situated above a substrate running in the plane of the paper. Structures 1, 2 are produced, for example, by depositing an electrically conductive polysilicon layer onto an oxide layer which is, in turn, provided on a silicon substrate. Recesses are formed in the oxide layer, so that interconnections are created from the polysilicon layer to the silicon substrate in these recesses. The patterns are then specified and the oxide layer is removed in an etching process. In so doing, the polysilicon layer remains joined to the silicon substrate.

Each of structures 1, 2 has two drive mass elements 3. Drive mass elements 3 are connected to the substrate lying below them via four drive mass springs 4 at ends 5. In each case two drive mass springs 4, which connect the same drive mass element 3 to the substrate lying below it, lie opposite in the y direction, in this context, which runs along the surface of the substrate. The deflections of drive mass elements 3 are thus limited in the y direction by opposite ends 5 relative to the substrate lying below them. Drive mass springs 4 are each situated in a rectangular recess 6 in one of drive mass elements 3. Because of the alignment of their folds, springs 4 are above all extensible in the y direction, while oscillations of drive mass elements 3 in the x direction are suppressed. Because of the application of drive mass springs 4 in recesses 6, in this context, there is still sufficient space on the sides of drive mass elements 3 to position comb drives 9, by which drive mass elements 3 may be put into oscillation in the y direction.

The two drive mass elements 3 of each structure 1, 2 are connected via eight detection mass springs 7 to an essentially rectangular detection mass element 8 (two springs 7 on each side). Detection element 8 may be provided with holes going all the way through (e.g. perforations). The two drive mass elements 3 almost completely surround detection mass element 8, but leave room for connecting a coupling spring 10 and a substrate spring 11 to detection mass element 8. In each case, two of detection mass springs 7 lying opposite to each other are mounted on two sides of detection mass element 8. Because of the development and this mounting of detection mass springs 7, oscillations of detection mass element 8 to drive elements 3 in the y direction and in the x direction are suppressed, while a relative motion of detection mass element 8 in a z direction, perpendicular to the surface of the substrate, is easily possible.

Detection mass elements 8 are coupled to each other via coupling spring 10. For the purpose of stabilization, detection mass elements 8 are connected to the underlying substrate via substrate springs 11, at the ends 12 of substrate springs 11.

At the opposite sides of detection mass elements 8, along the y direction, rectangular recesses 13 are provided, between which rectangular projections 14 are developed. On the substrate, under rectangular recesses 13, electrode pairs 15, 16 are developed, which are electrically insulated from the substrate. Electrodes 15 are each electrically connected to current supply $V_1$, and electrodes 16 are each electrically connected to a current supply $V_2$, so that electrodes 15 are able to be supplied with a different voltage from that of electrodes 16. Structures 1, 2, and thus projections 14, are electrically connected to current supply $V_3$.

When the sensor is rotated about the x axis, drive mass elements 3 for all specific embodiments are excited by comb drives 9 to oscillations along the y axis. The Coriolis force is then directed in the z direction, perpendicular to the surface of the substrate. In the process, the frequency of comb drives 9 is preferably selected in such a way that detection mass elements 8 are excited to oscillations in phase opposition, based on the coupling. Below detection mass elements 8, there is developed in each case an electrode as a detection device in the substrate. If detection mass elements 8 are set into oscillations in the z direction by the Coriolis force, there is a change in the capacitances with respect to the superjacent detection mass elements. By subtraction of the signals of the electrodes, interference accelerations, for instance, by translation of the sensor, may simply be compensated for. In addition, because of the suitable dimensioning of drive mass elements 3 and detection mass elements 8, it is assured that their common center of mass is invariant in time.

Between drive mass elements 3 and detection mass elements 8, additional oscillating mass elements may also be provided that are coupled to one another. Thus, it is possible to transfer only the oscillation in the z direction, based on the Coriolis force, to detection mass elements 8.

Figure 2A:
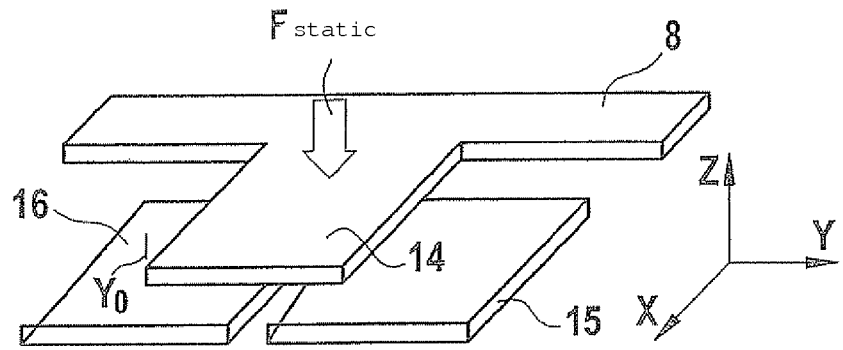
FIGS. 2a to 2c show views of an electrode constellation of the compensation device in FIG. 1 in different deflections of the detection mass element.

FIG. 2a shows an electrode pair of the compensation device which are situated under detection mass element 8 that is not deflected. In position $Y_0$ that is not deflected, a covering region between electrode 15 and projection 14 and a covering region between electrode 16 and projection 14 are of the same magnitude. Based on voltage $V_3$ applied to detection mass elements 8, voltage $V_2$ applied to electrode 15 and voltage $V_1$ applied to electrode 16, a force acts between electrodes 15, 16 and projection 14 which slightly shifts detection elements 8 in a decreasing z direction.

The electrostatic compensation force acting on detection mass elements 8 along the z axis is determined by forces $F_{static}$ and $F_{dynamic}$ acting along the z axis. $F_{static}$ is a proportion of the force which acts independently of the deflection. $F_{dynamic}$ is dependent on a deflection $\Delta Y$ of the detection mass element along the y axis from resting position $Y_0$. In FIG. 2a, the deflection is zero and $F_{dynamic}$ is zero; the resulting force is $F_{static}$.

Figure 2B:
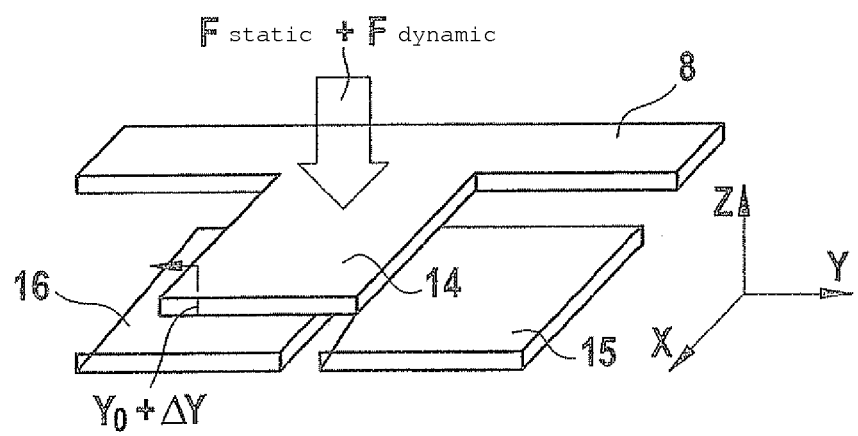

FIG. 2b shows a view of an electrode pair 15, 16 of the compensation device having a detection mass element 8 deflected in one direction. In deflected position $Y_0+\Delta Y$, a covering region between electrode 15 and projection 14 is smaller than a covering region between electrode 16 and projection 14. $F_{dynamic}$ acts in the direction of $F_{static}$, since now electrode 16 has a greater influence on detection mass elements 8 than it had in the non-deflected position of FIG. 2a. F is greater than in the representation of FIG. 2a.

Figure 2C:
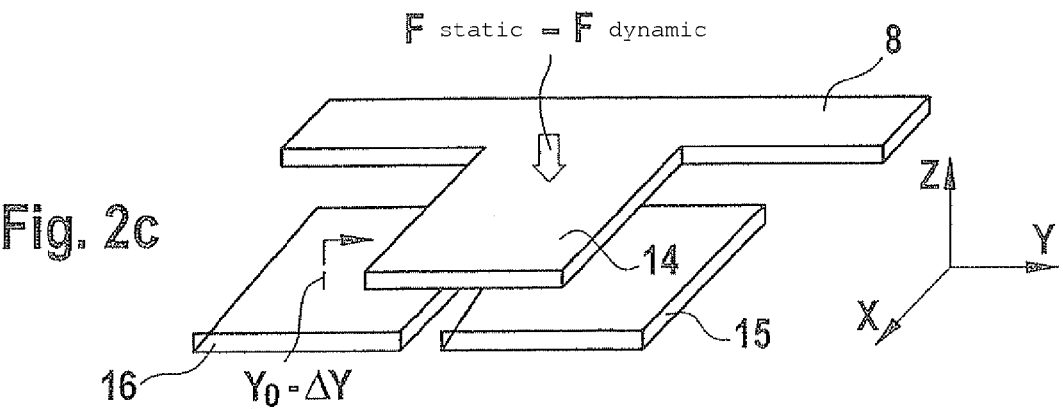

FIG. 2c shows a view of an electrode pair 15, 16 of the compensation device having a detection mass elements 8 deflected in the opposite direction. In deflected position $Y_0+\Delta Y$, a covering region between electrode 15 and projection 14 is larger than a covering region between electrode 16 and projection 14. $F_{dynamic}$ acts in the direction opposite to $F_{static}$, since now electrode 15 has a greater influence on detection mass element 8 than it had in the non-deflected position of FIG. 2a. F is smaller than in the representation of FIG. 2a.

In response to a suitable setting of voltages $V_1$ and $V_2$, those forces may be compensated for, by the force action of electrodes 15 and 16 on electrode 14, which lead to the undesired oscillations of detection mass element 8 in the z direction, and thus to quadrature signals. Based on the separate current supply for electrodes 15 and 14, the quadrature signals may be corrected individually in two opposite directions, in this context. Alternatively to this, a correction may also be implemented in one direction using only one voltage.

Figure 3A:
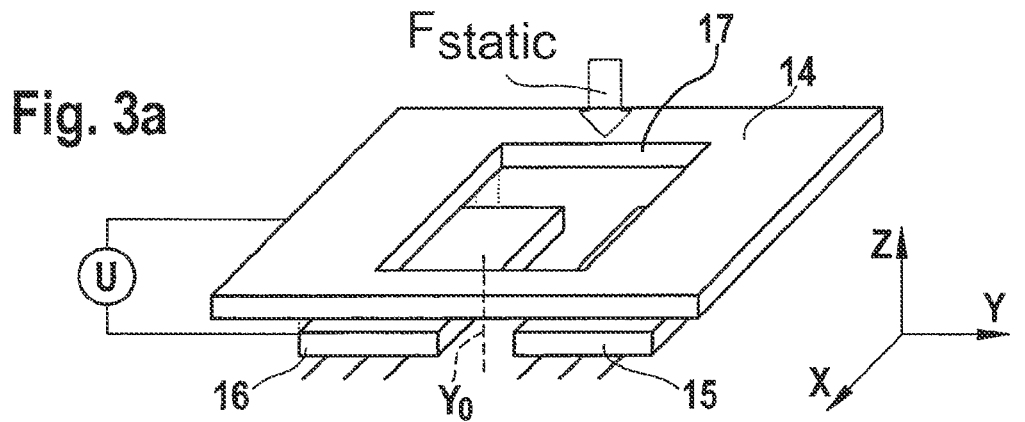
FIGS. 3a to 3b show views corresponding to 2a to 2c of an alternative electrode constellation of the compensation device in FIG. 1.
Figure 3B:
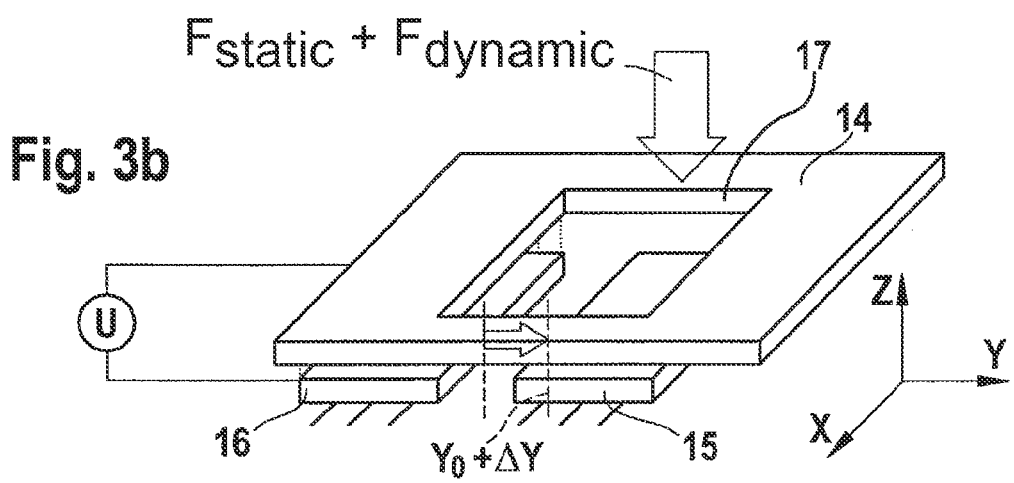
Figure 3C:
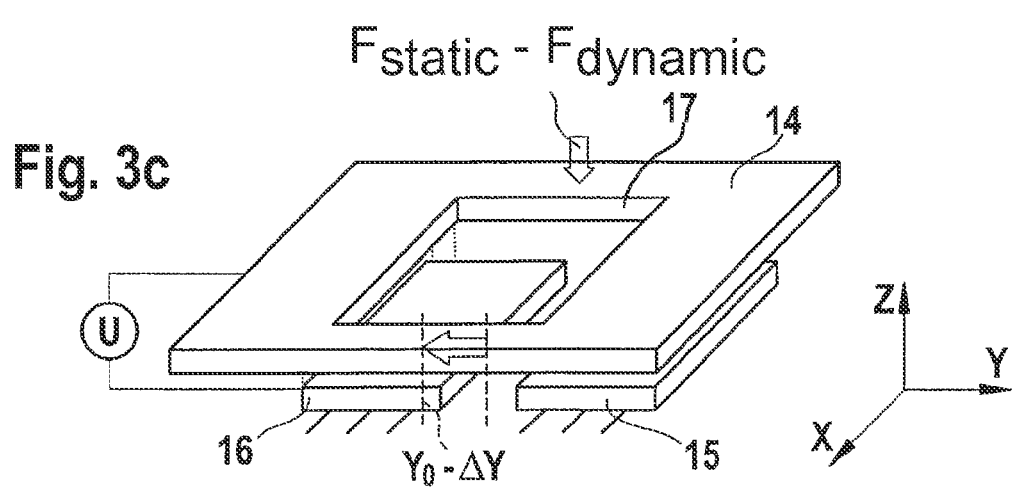

FIGS. 3a to 3c show an alternative design of the electrodes of the compensation device of FIGS. 2a to 2c. Detection mass element 8 is not shown here; it extends from electrode 14 towards the x direction in the x-y plane. However, electrode 14 of detection mass element 8 is not finger-shaped as in FIGS. 2a to 2c, but runs around an insulating region 17 in detection mass element 8, so that the edge of electrode facing the observer, running in the y direction, closes in a straight manner. The insulating region 17 may be a recess in detection mass element 8. Alternatively, the insulating region 17 may be made up of an electrically insulating material. In another specific embodiment, an electrode 14 extending into this region may also be screened from electrostatic forces, for instance, using an electrically conductive covering (not shown).

The electrode shape shown in FIGS. 3a to 3c may be mounted along two opposite edges of detection mass element 8, for example (cf. the position of electrodes 14 in FIG. 1). Detection mass element 8 having the electrodes as in FIGS. 3a to 3c is clearly more compact than is shown in FIG. 1, and has four straight outer edges. Because of this minimization of the fissures in the outer edge, the danger is significantly reduced that filigree spring structures bordering on, or striking detection mass element 8 (such as detection mass springs 7, coupling spring 10, substrate spring 11) might break when there is a great deflection of detection mass element 8. Such great deflections might come about in the motor vehicle environment based on unevenness in the ground, strong braking or rapid cornering.

A further advantage of the electrode shapes shown in FIGS. 3a to 3c is that the lengths of the individual structures of the compensation device are able to be kept short, conditioned on the design. The natural frequency of the structures of electrode 14 are therefore above a range in which the influencing of the functioning of the sensor element is able to take place, for instance, by exciting such a natural frequency (eigenmode) by the drive motion of detection mass element 8. In addition, the straight outer edge of electrode 14 stiffens detection mass element 8 in such a way that natural oscillations that might occur are effectively damped.

What is claimed is:

1. A rotation-rate sensor comprising:

a substrate having a surface;

a movable element situated above the surface, that is deflectable, based on a Coriolis force, along a first axis running perpendicular to the surface, the movable element including at least one first electrode surrounding a recessed insulating region in the movable element;

a driving device for activating the movable element along a second axis that runs parallel to the surface;

a compensation device including a plurality of second electrodes and a current supply supplying a voltage to at least one of the second electrodes, wherein at least one of the second electrodes overlaps the at least one first electrode in a direction of the first axis by a degree that varies as a function of a deflection of the movable element along the second axis and the current supply applies a corrective voltage to the at least one second electrode to compensate for a deflection of the movable element along the first axis due to a change in position of the movable element along the second axis; and first and second spring elements connecting respective first and second opposing edges of the movable element to at least one drive mass of the driving device, the first and second spring elements each including at least one flexure portion extending substantially parallel to the respective first or second opposing edge, wherein the at least one first electrode of the movable element surrounds first and second pluralities of the recessed insulating regions, the first and second pluralities of recessed insulating regions each arranged in a linear grouping aligned with and proximate to a respective one of the first and second opposing edges.

2. The rotation-rate sensor according to claim 1, wherein compensation device includes at least one pair of second electrodes and the recessed insulating region in the movable element is aligned with the pair of second electrodes in the non-deflected state so the at least one first electrode covers a same area of each of the second electrodes in the pair.

3. The rotation-rate sensor according to claim 2, wherein the pair of second electrodes are situated on the substrate and are situated on different sides of a center line, which runs in a direction of a third axis that runs perpendicular to the second axis and parallel to the surface.

4. The rotation-rate sensor according to claim 3, wherein an insulating region of the movable element is situated symmetrically over the center line in a deflection-free position of the movable element in a direction of the second axis.

5. The rotation-rate sensor according to claim 3, further comprising at least one source supplying a first voltage between the electrode of the movable element and the first electrode and a second voltage between the electrode of the movable element and the second electrode that is different from the first voltage.

6. The rotation-rate sensor according to claim 5, wherein the first and second voltages differ in their signs, so that as a function of the sign of a deflection of the movable element along the second axis, an attractive or a repulsive force is exerted between the movable element and the substrate along the first axis.

7. The rotation-rate sensor according to claim 1, wherein a number of insulating regions in an edge region of the movable element have the electrode extending around them in such a way that fissures in an edge region of the movable element, that runs perpendicular to the first axis, are not created.

8. The rotation-rate sensor according to claim 7, wherein the edge region of the movable element forms four substantially straight outer edges.

9. The rotation-rate sensor according to claim 8, wherein a number of elastic elements are fastened to the outer edges of the movable element.

\* \* \* \* \*